(No Model.)
G. H. HULL.
COMBINED SPECTACLES AND WATCH MAKER'S EYEGLASS.
No. 331,791. Patented Dec. 8, 1885.
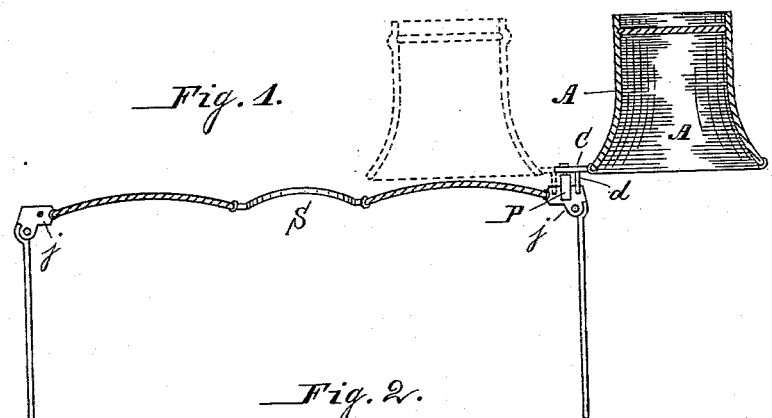
Fig. 1.
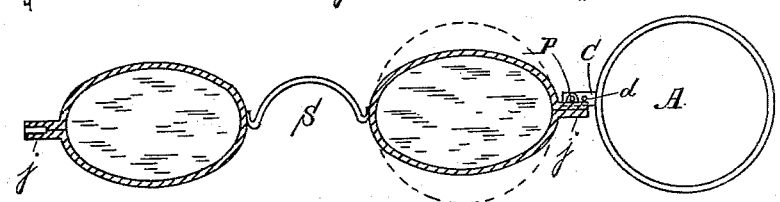
Fig. 2.
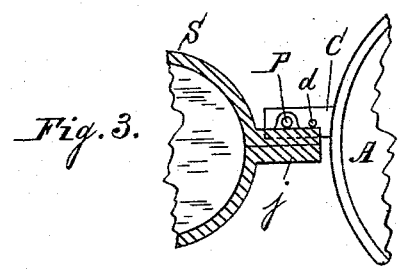
Fig. 3.
Fig. 4.
WITNESSES:
Theodore Laughrin
James B. Switt
INVENTOR:
Granville H. Hull,
Per
James B. Ligius & Co.
Attorneys.

UNITED STATES PATENT OFFICE.

GRANVILLE H. HULL, OF LAFAYETTE, INDIANA.

COMBINED SPECTACLES AND WATCH-MAKER'S EYEGLASS.

SPECIFICATION forming part of Letters Patent No. 331,791, dated December 8 1885.

Application filed August 10, 1885. Serial No. 173,978. (No model.)

*To all whom it may concern:*

Be it known that I, GRANVILLE H. HULL, a citizen of the United States, residing at Lafayette, in the county of Tippecanoe and State of Indiana, have invented certain new and useful Improvements in Combined Spectacles and Eyeglass, of which the following is a specification.

My invention relates to combined spectacles and eyeglass, such are used by watch-makers, jewelers, and engravers; and the objects of my improvements are to provide a device in which the eyeglass is attached to the spectacle-frame in such a manner that it, when thrown in front of the spectacle-lenses or away from the same, will stay in the desired position without being affected by the movements of the head of the wearer. I attain this object by the peculiar manner of attaching the eyeglass to the spectacle-frame, illustrated in the accompanying drawings, in which—

Figure 1 is a horizontal section through the eyeglass and spectacles; Fig. 2, a vertical section through the same; Fig. 3, a large scale vertical section through the end joint of the spectacle-frame, with the eyeglass pivoted thereto; and Fig. 4, a section showing a different method of pivoting the eyeglass to the spectacle-frame.

In Figs. 1 and 2 the dotted lines show the eyeglass in front of the spectacle-lenses.

Similar letters refer to similar parts throughout the several views.

S are the spectacles, frame, and lenses; $j\,j$, the end joints of the spectacle-frame; A, the eyeglass. The eyeglass A is attached to the end joint, $j$, of the spectacle-frame S in the following manner: An arm, C, is rigidly secured either directly to the large flange of the eyeglass-frame A or to a grooved wire encircling said flange. This arm C is pivoted either to the top or to the front of the spectacle-joint $j$ in such a manner that the eyeglass A can be swung around vertically in front of the spectacle-lenses or away from them, as desired, the former method being illustrated in Figs. 1, 2, and 3, the latter in Fig. 4.

To keep the eyeglass in its desired position either in front of the eye or away from the same, a stud or pin, $d$, is secured to the arm C, projecting back horizontally from said arm, and resting on and against the end joint, $j$, both when the eyeglass is in front of the spectacle-lenses or when it is swung away from the same. When the arm C is pivoted to the top of the end joint, $j$, as shown in Figs. 1, 2, and 3, the said pin $d$ must be secured to the arm C at a point located between the pivot P and the eyeglass-flange, and on a horizontal line with the pivot, and it will rest on top of the end joint when the glass is in front of the eye, as well as when it is swung away from the same, but when the glass is pivoted to the front of the joint $j$, as shown in Fig. 4, the pin $d$ must be secured to the arm C at such a place that it will rest against a shoulder, $p$, on the top of the joint $j$ when the glass is in front of the eye and against the bottom of the joint $j$ when the glass is swung away from the eye. In either construction the weight of the eyeglass keeps the same in its proper position in front of the eye or away from the same, the pin $d$ preventing the glass from dropping out of place and hanging down below the spectacle-frame.

By pivoting the eyeglass vertically to the spectacle-joint, as described, the same is obliged to stay in the desired position, it requiring the use of the hand of the wearer to throw the glass out of position in front of the spectacle-lenses and back, while, where the glass is pivoted horizontally to the spectacle end joint, the forward stooping motion of the operator's head will affect the position of the glass, especially when the pivot-joint between glass and spectacles is not very tight and hard working.

I am aware that prior to my invention combined spectacles and eyeglasses have been made with the eyeglass pivoted or hinged horizontally to one end of the spectacle-frame. I therefore do not claim the combination of a pair of spectacles and an eyeglass, broadly; but

What I claim as my invention and desire to secure by Letters Patent, is—

The combination, with a pair of spectacles, S, of an eyeglass, A, an arm, C, rigidly secured to and supporting the eyeglass A, and being pivoted to the end joint, $j$, of the spectacle-frame in such a manner as to allow the eyeglass to be swung around vertically in front of the spectacle-lenses and away from them, and a projecting pin or stud, $d$, secured to the arm C at such a place that it will rest against the end joint, $j$, of the spectacle-frame, and form a stop for the eyeglass A in either position in front of the spectacle-lenses or away from them, substantially as described and specified.

In testimony whereof I have signed my name to this specification in the presence of two subscribing witnesses.

GRANVILLE H. HULL.

Witnesses:
L. G. HAMILTON,
C. R. SEIFERT.